(12) United States Patent
Sampaoli et al.

(10) Patent No.: US 8,250,969 B2
(45) Date of Patent: Aug. 28, 2012

(54) APPARATUS FOR THE PREPARATION AND DISPENSING OF INFUSIONS, PARTICULARLY COFFEE, IN VARIABLE VOLUMETRIC DOSES

(75) Inventors: Davide Sampaoli, Binasco (IT); Guido Quaratesi, Binasco (IT); Claudio Volonté, Binasco (IT)

(73) Assignee: Gruppo Cimbali S.p.A., Binasco MI (IT)

( * ) Notice: Subject to any disclaimer, the term of this patent is extended or adjusted under 35 U.S.C. 154(b) by 390 days.

(21) Appl. No.: 12/726,480

(22) Filed: Mar. 18, 2010

(65) Prior Publication Data

US 2010/0236417 A1 Sep. 23, 2010

(30) Foreign Application Priority Data

Mar. 20, 2009 (EP) ..................................... 09425109

(51) Int. Cl.
*A47J 31/40* (2006.01)
(52) U.S. Cl. ........................................ 99/287; 99/289 R
(58) Field of Classification Search .................. 99/302 P, 99/302 R, 297, 287, 289 R
See application file for complete search history.

(56) References Cited

U.S. PATENT DOCUMENTS

| 4,188,863 | A | * | 2/1980 | Grossi .............................. 99/286 |
| 4,579,049 | A | * | 4/1986 | Rodrigues ..................... 99/289 R |
| 4,681,028 | A | * | 7/1987 | Schmed et al. ............... 99/289 R |
| 4,796,521 | A | * | 1/1989 | Grossi .............................. 99/287 |
| 4,885,986 | A | * | 12/1989 | Grossi ........................... 99/289 R |
| 5,259,296 | A | * | 11/1993 | Mikael et al. ................... 99/280 |
| 5,722,313 | A | * | 3/1998 | Schmed ....................... 99/289 R |
| 6,739,240 | B2 | * | 5/2004 | De Koning et al. ............. 99/283 |
| 7,024,985 | B2 | * | 4/2006 | Park .............................. 99/302 P |
| 2009/0223374 | A1 | * | 9/2009 | Morin et al. .................... 99/287 |
| 2010/0236417 | A1 | * | 9/2010 | Sampaoli et al. ............... 99/287 |
| 2010/0236418 | A1 | * | 9/2010 | Sampaoli et al. ............... 99/287 |

FOREIGN PATENT DOCUMENTS

| EP | 1 306 041 | 5/2003 |
| WO | 2009/007804 | 1/2009 |

OTHER PUBLICATIONS

Italian Search Report for MI20090425, dated Oct. 12, 2009.

* cited by examiner

*Primary Examiner* — Raleigh W. Chiu
(74) *Attorney, Agent, or Firm* — Nixon & Vanderhye PC (57) ABSTRACT

An apparatus for the preparation and dispensing of doses, in selectable variable volumes, of infusions, particularly of coffee, by means of pressurised water, comprising a cylindrical infusion chamber provided with a closed end and an opposed open end, a piston with an end axially insertable into said infusion chamber via said open end and removable therefrom, water feeding element for feeding a predetermined quantity of pressurised water into said chamber and for opening into the latter in the zone comprised between the end of the piston inserted into the chamber and the closed end of the chamber.

3 Claims, 10 Drawing Sheets

APPARATUS FOR THE PREPARATION AND DISPENSING OF INFUSIONS, PARTICULARLY COFFEE, IN VARIABLE VOLUMETRIC DOSES

This application claims priority to European Application No. 09425109.7, filed 20 Mar. 2009 the entire content of which is hereby incorporated by reference.

BACKGROUND OF THE INVENTION

In the field of automatic preparation and dispensing of espresso coffee, known apparatuses are described for example in EP-A 0 154 206 and in EP-A 1 306 041.

As is known, espresso coffee is prepared by forcing hot water, normally at a temperature of between 88° C. and 95° C., to pass through a layer of ground coffee, which will be indicated hereinafter as powdered product or simply as coffee powder.

In order to carry out the process of preparing the beverage, the chamber, containing the powdered product, must be hermetically sealed to allow the pressurisation of the water which has to pass through the layer of powder and, consequently, one of the characteristic technical problems which face the designer of a coffee machine is that of ensuring adequate and reliable closure of the chamber in which the process of preparation of the beverage takes place.

The spread of espresso coffee machines in the world has led to diversification of the types of this beverage which have been influenced by the taste and tradition of the various countries.

Therefore, the quantity of coffee powder used and the volume of the beverage dispensed into the cup may be very varied. For example, to prepare a "ristretto" espresso of the Mediterranean type of 15 ccm, an average of 6 grams of ground coffee are used, whereas to prepare a dose of coffee of 120-150 ccm as consumed in Northern Europe up to 18 grams of ground coffee may be required.

However, since the pressure at which the water is forced through the coffee powder and the extraction time for the beverage should remain as constantly as possible at the ideal nominal value respectively of 9 bar and 25 seconds, the optimisation of the process of preparation of the beverage in all situations comprised between the two extremes of doses indicated above, involves the adaptation of the fineness of grinding, and of the volume and the diameter of the infusion chamber.

The dimensions of the diameter of these chambers, generally cylindrical in shape vary, according to the type of coffee, between 35 mm and 50 mm.

This means that with a pressure of 9 bar there may be, on the members which effect the closure of the infusion chamber, forces of between 880 and 1800 N in the direction of their axis.

In the dispensing devices of modern automatic type coffee machines which are normally actuated by electric motors, the movements of opening and closing of the infusion chamber are devised in such a way as to prevent the reversibility of the movement under the action of the force resulting from the pressure exerted by the water during the preparation of the beverage.

Normally, the prior art seeks to obtain this result through stops of a mechanical type in order to avoid maintaining under stress the motors of the actuating means which would otherwise have to be over-sized in order to withstand prolonged and heavy service.

In order to obtain a good quality dispensed beverage it is also necessary that, before being subjected to the thrust of the pressurised water, the coffee powder is adequately compacted inside the infusion chamber in such a way as to form a firm layer which has a homogeneous resistance to the water, which should pass through it without forming preferred paths.

However, it is desirable that the force with which the dose of coffee powder is compressed is not too great, otherwise there is a risk of forming a layer so compacted that it forms a barrier to the water.

Normally, a force is selected which is such as to provide a pressure of around 0.15 MPa on the member arranged to effect the compression of the dose of powder.

Moreover, in order to obtain correct extraction of the aromatic substances typical of the beverage, the grains of ground coffee should absorb the water which is forced to pass through them and they should be able to increase in volume.

For this it is necessary that the member which effects the compaction, which is generally formed by the same piston which performs the function of closing the infusion chamber, once compaction is completed should be able to retract by an amount sufficient to permit the expansion of the firm layer of ground coffee.

According to the prior art, described for example in EP-A-1 800 574, the dispensing units are provided with infusion chambers in which the operating volume is determined when the piston is in the closure position with the connecting rod and crank in alignment. With such technology the chamber may contain at maximum a certain quantity of ground coffee which depends on the diameter of the chamber and on the dimensions of the means for moving the piston, i.e. of the connecting rod and crank. The compressive force exerted on the dose of coffee powder loaded into the chamber is provided by the resilient force of a spring interposed between the end of the connecting rod and its point of connection to the piston. Since the resilient force possessed by such a spring is less than the force generated by the pressurised water when it is admitted into the chamber, the piston rises up and allows the ground coffee to absorb the water and to expand.

Document EP-A-1 306 041 discloses a movement device for infusion dispenser assemblies, particularly for espresso coffee machines, which comprises a dispenser body that forms an infusion chamber and is supported by a supporting frame, a lower piston or dispensing piston being movable in said infusion chamber, an upper piston or infusion piston being insertable in said infusion chamber, and means for actuating said lower piston which are suitable to guide positively the translational motion of said lower piston during the upward or expulsion stroke and during the descent or return stroke.

Once dispensing of the beverage is completed, the flow of pressurised water is stopped and the residual water must be eliminated from the chamber and the exhausted grounds expelled. Generally, the residual water is eliminated by placing the chamber in communication with a discharge line while the resilient means itself which, once the thrust of the pressure has ceased, returns to compact the grounds and presses out the water. When sufficient time has elapsed to obtain adequate drying of the grounds, they are then expelled in order to prepare the chamber for any new dispensing. This type of dispensing unit, designed so as to effect the loading and closure of the chamber during the first half turn of the crank so as to carry out dispensing at bottom dead centre, are designed so as to perform the expulsion movements by advancing the crank beyond bottom dead centre in order to execute a complete revolution which brings the mechanism back into the initial state, ready to carry out a fresh cycle.

Although this is quite an efficient technique, it is however not devoid of drawbacks in the case where it is desired to increase the dose of ground coffee to be inserted into the infusion chamber. In that case it is necessary either to modify the diameter of the chamber or make it much longer, increasing the stroke of the piston, which solution entails the modification of the length of the connecting rod and of the crank.

The Applicant has observed that, when it is wished to produce a machine which, based on the above-mentioned technology, enables different types of coffee to be dispensed by using doses of powdered product of between 6 and 18 grams, once the cross-section of the infusion chamber is established, it becomes necessary to make its length such as to contain the product up to the maximum quantity by adjusting the stroke of the connecting rod and crank.

However, operating in this way it is possible to obtain the alignment of the connecting rod with the crank, in such a way as to maintain the axially aligned thrusts and avoid the occurrence of torque on the drive shaft which must be overcome by the motor itself in order to keep the chamber closed, only when the minimum quantity of ground product is used and the piston is in the position in which it is inserted farthest into the cylindrical chamber and positioned in proximity to the bottom thereof. For all other doses the rotational point of connection between the connecting rod and the crank must stop before bottom dead centre along the path of the connecting rod head.

With such positioning, the admission of the pressurised water into the chamber causes a torque to be produced on the drive shaft and, to compensate the torque, it is necessary to adopt particular technical solutions.

One of these solutions, for example, provides that the motor must be excited in such a way as to apply a greater counter torque in order to ensure the closure of the infusion chamber by the piston.

This solution, however, would require the use of an expensive high torque reduction motor capable of resisting with the motor locked for the entire time of preparation of the beverage without exceeding the admissible heating up limit.

Moreover, with the aforesaid constructional solution, the layer of compressed coffee powder would be prevented from swelling up and therefore from correctly absorbing the water, since the motor would have to exert a torque such as to ensure that the connecting rod reacted with a force greater than that generated by the pressure of the water continuing to compress the layer of coffee powder.

Finally, the fact of using a volume of coffee powder such as to prevent the connecting rod from reaching bottom dead centre raises the problem of how to be able to act on the device for expelling the quantity of exhausted powder from the infusion chamber once the preparation of the beverage is completed.

For example, under these conditions the technical solution illustrated in EP-A-1 306 041 would not be longer practicable.

SUMMARY OF THE INVENTION

A main aim of the present invention is to propose an apparatus capable of dispensing coffee in doses having different volumes, by using an infusion chamber with fixed diameter and varying its volume via the different positioning and stopping of the piston for closure of the chamber, but overcoming the drawbacks mentioned above and encountered in the apparatuses of known type.

The present invention is directed to an apparatus for the preparation and dispensing of doses, in selectable variable volumes, of infusions, particularly of coffee, by means of pressurised water, comprising an infusion chamber provided with a closed end and an opposed open end, a piston with an end axially insertable into said infusion chamber via said open end and removable therefrom, water feeding element for feeding a predetermined quantity of pressurised water into said chamber and for opening into the latter in the zone comprised between the end of the piston inserted into the chamber and the closed end of the chamber. The apparatus further comprises a powdered product feeding device for feeding a predetermined quantity of powdered product into said infusion chamber to form the infusion in an amount proportional to the volume selected for the dose of infusion to be prepared and displacement elements for displacing said infusion chamber between the position in which a defined quantity of powdered coffee is introduced and the position in which said piston is inserted and withdrawn via said open end and vice versa, at least one opening in said chamber for dispensing the prepared infusion. The apparatus includes an expulsion device for expelling from said infusion chamber the quantity of exhausted product used for the infusion at the end of preparation thereof, a drive device for actuating said piston within said infusion chamber and outside it, a guide element for the piston, said drive device comprising an electric motor, a connecting-rod-and-crank mechanism in which a crank is connected to a rotation shaft of the motor and the connecting rod is connected between an end of the crank and the end of the piston which remains outside said infusion chamber, and a control unit for controlling the drive device and the water feeding element for feeding pressurised water into said infusion chamber. The motor is reversible in its direction of rotation. The expulsion device comprises a small plate positioned inside said infusion chamber in proximity to the bottom thereof, and movable axially within the chamber, a stem connected to said plate and emerging so as to slide in a sealed manner through an opening of said closed bottom, the free end of said stem being provided with an engaging member for engagement with cam profiles borne by a rotating disc keyed onto the rotation shaft of said motor with reversible direction of rotation, said profiles being selected according to the direction of rotation of the motor. The apparatus is provided with fitting devices for engaging said engaging member in a first cam profile, when the motor rotates in a first direction of rotation, and in at least a second cam profile when the direction of rotation of the motor is reversed, said fitting devices being provided on board said disc.

BRIEF DESCRIPTION OF THE DRAWINGS

The invention will now be described in greater detail with reference to a preferred embodiment thereof, illustrated by way of non-limiting example in the appended drawings, in which.

DETAILED DESCRIPTION OF THE PREFERRED EMBODIMENTS

With reference to the aforesaid Figures, the reference 1 indicates generally a wall of the containment frame of the apparatus. The latter comprises a cylinder 2, of which the internal chamber 3 constitutes the infusion chamber in which the beverage, in particular coffee, is prepared. Preferably, the infusion chamber has a cylindrical shape with circular cross-section.

The cylinder 2 has an open end 4 and a closed bottom 5, the latter being provided with an opening for the passage of the means for expelling the layer of exhausted coffee powder, as will be illustrated in detail hereinafter.

The discharge of the beverage, once it has been prepared, takes place via a conventional opening 3a, openable and closable, of the infusion chamber 3.

Inside the cylinder 2 are positioned a conventional filter 6 and a small plate 7, likewise conventional, forming part of the device for expelling the exhausted product at the end of preparation of the beverage, which will be described in greater detail hereinafter.

Through the open end 4, in the course of preparation of the beverage, as will become clearer hereinafter, a piston B is introduced which is provided with a sealing gasket 9 placed in proximity to its end 10.

The piston 8 is fixed to the end 11 of a connecting rod, indicated as a whole by 12, by means of a hinged connection represented by the pin 13.

Figure 2:
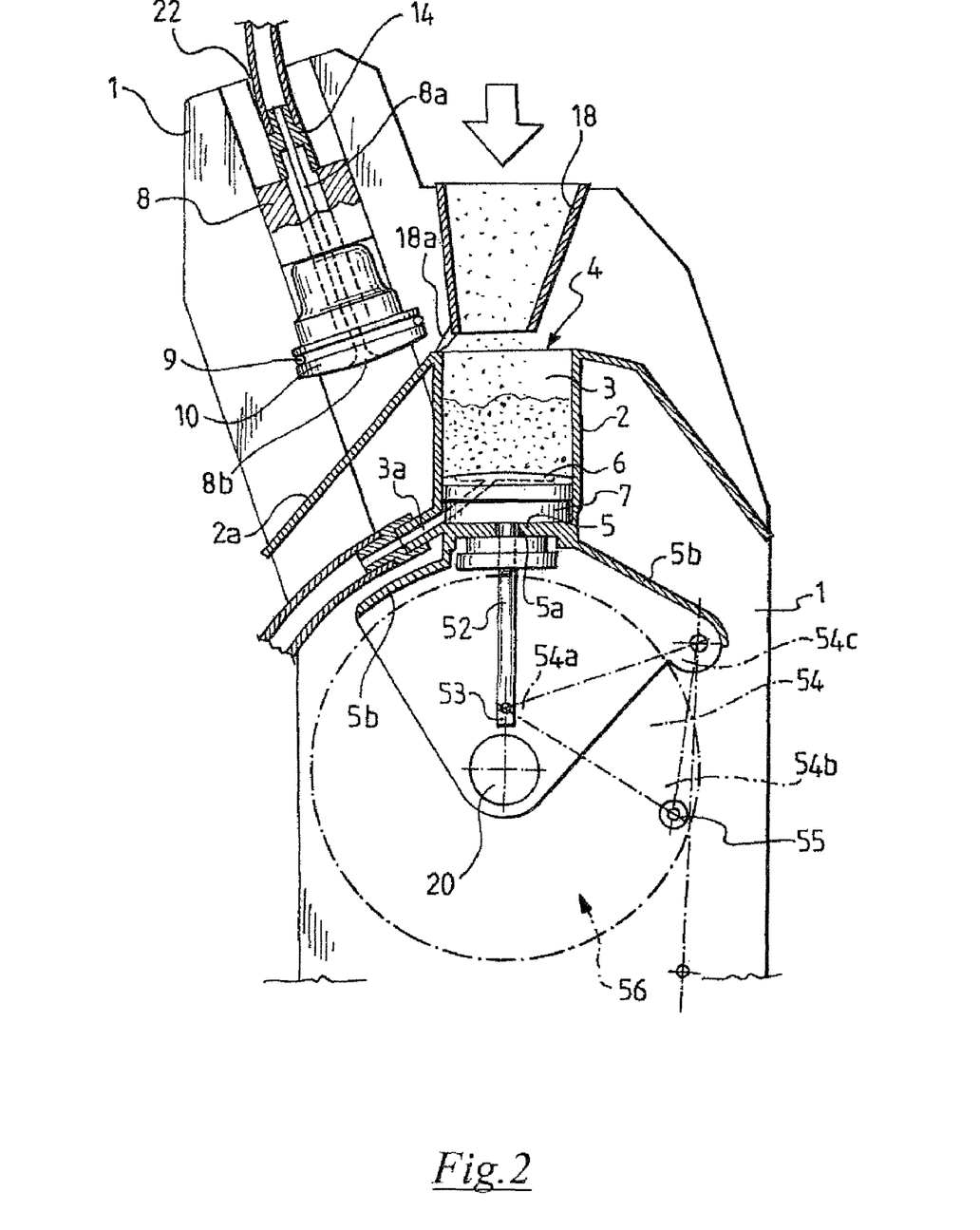
FIG. 2 shows a schematic side view of the apparatus illustrated in FIG. 1, with some parts removed for the sake of clarity.
Figure 4:
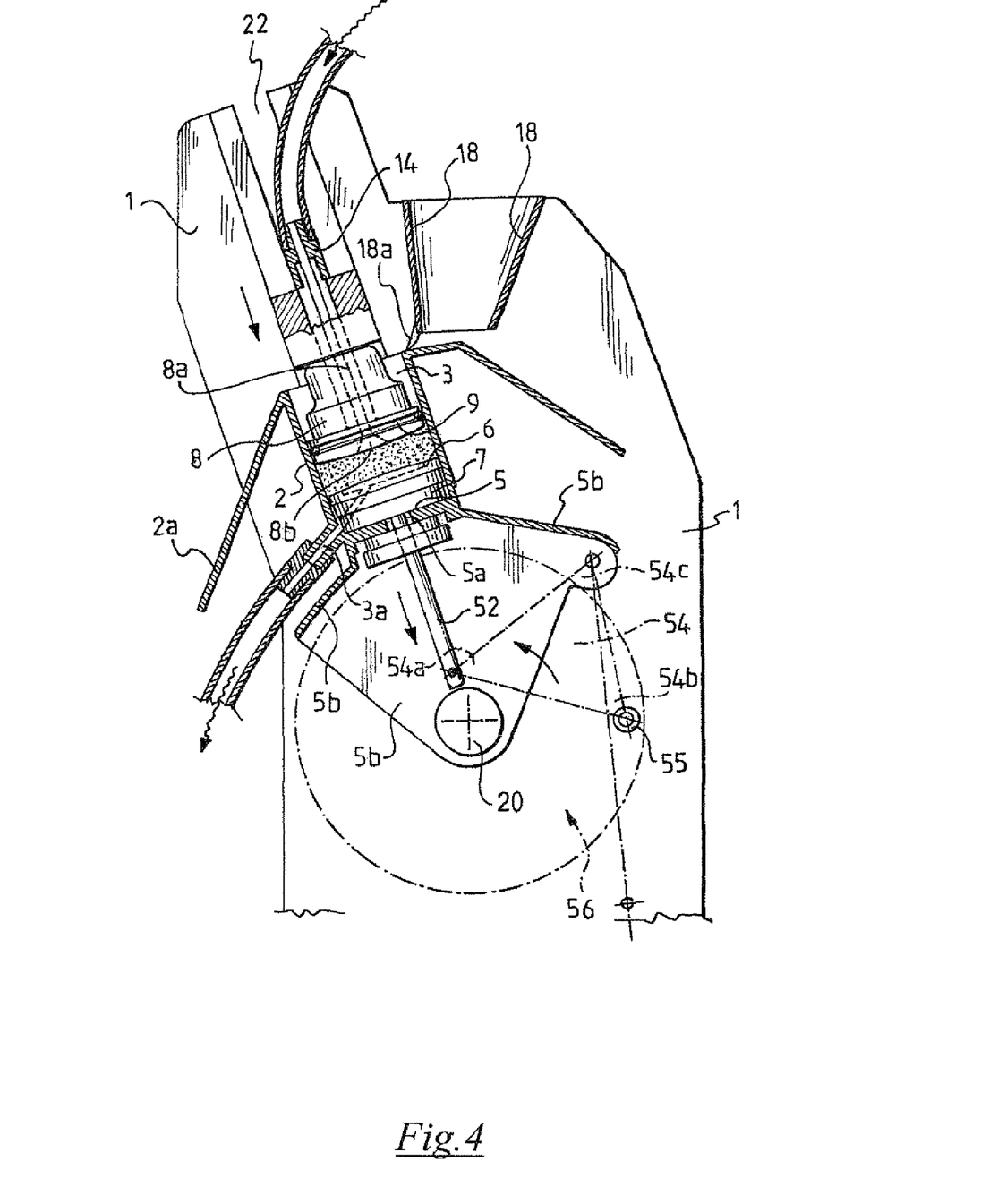
FIG. 4 shows a schematic side view of the apparatus illustrated in FIG. 3 with some parts removed for the sake of clarity.
Figure 10:
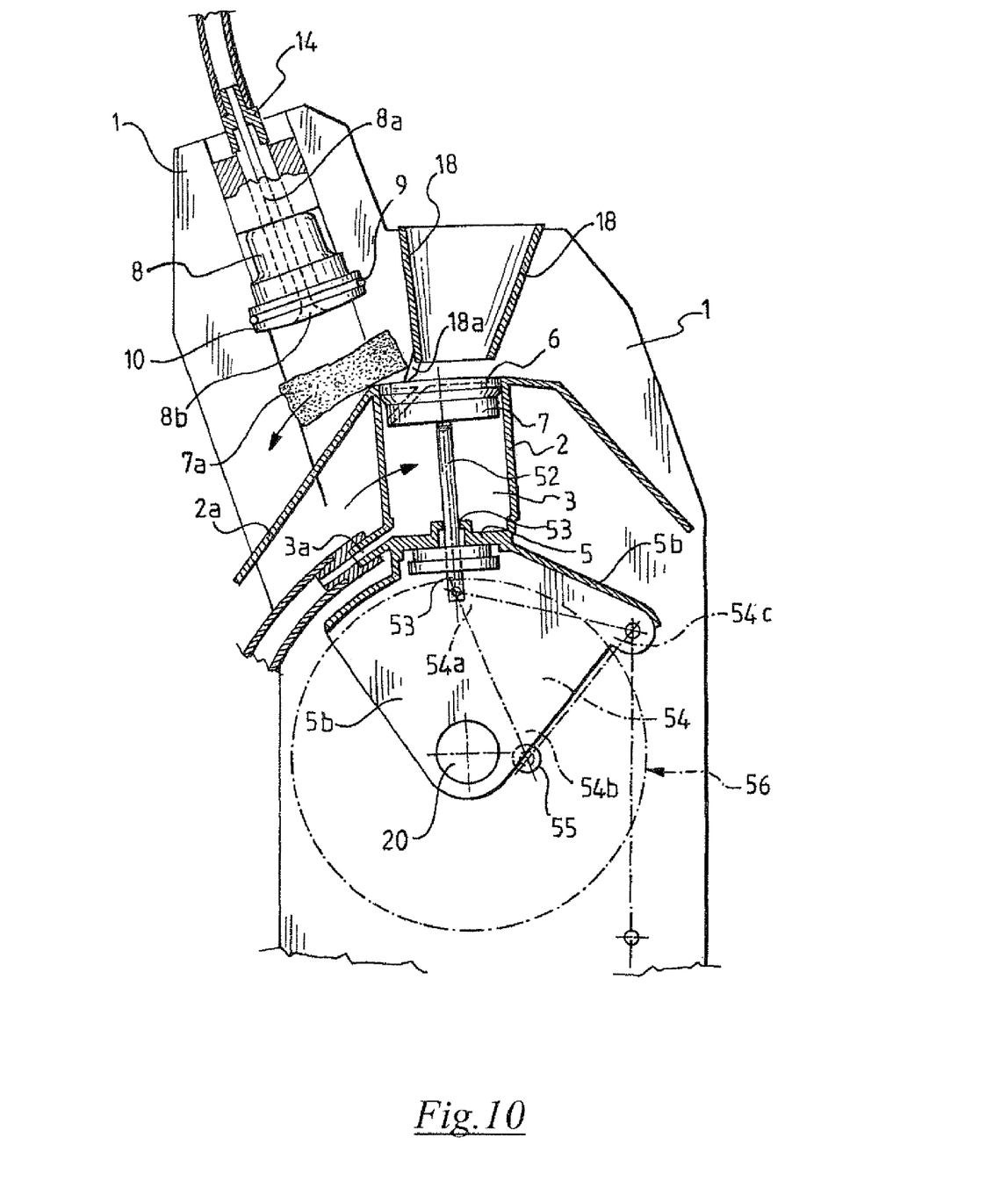
FIG. 10 shows a schematic side view of the apparatus according to an embodiment of the invention, illustrating the removal of the layer of exhausted ground product from the apparatus.
Figure 11:
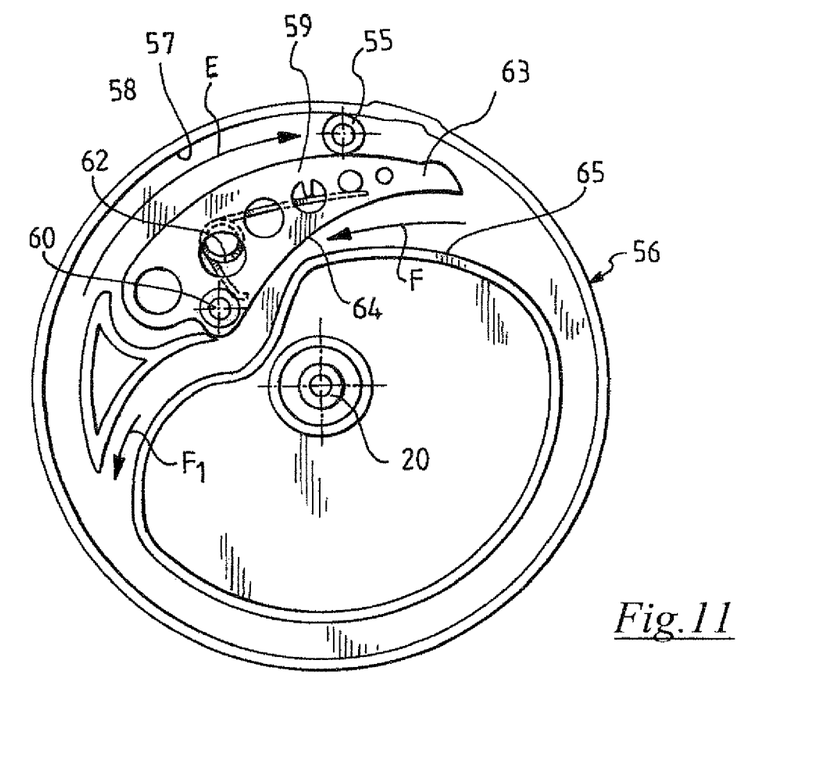
FIG. 11 shows a plan view of a cam, according to an embodiment of the invention, for the actuation of the expulsion device for expelling the layer of exhausted ground product, illustrated in a first position.

The piston 8 is provided in a conventional manner with an inner axial channel 8a which starts from a water feeding element, comprising a connector 14, and leads to an opening 8b, at the end 10 as indicated in FIGS. 2, 4 and 10.

Through the connector 14, pressurised water is fed in, generally at a defined temperature, for the preparation of the beverage when the piston 8 is located within the cylinder 2 and therefore the infusion chamber 3 is sealed closed by means of the gasket 9.

For the preparation of the beverage, before the infusion chamber 3 is closed, a defined dose of powdered product, particularly ground coffee, is introduced into the chamber by means of a powdered product feeding device.

The powdered product can be introduced in a conventional manner, for example by means of a grinding and dosing device comprising a hopper 15 for loading the coffee beans and a volute 16, actuated by an electric motor 17, which feeds a dose of product to a chute 18 opening into the cylinder 2.

Figure 1:
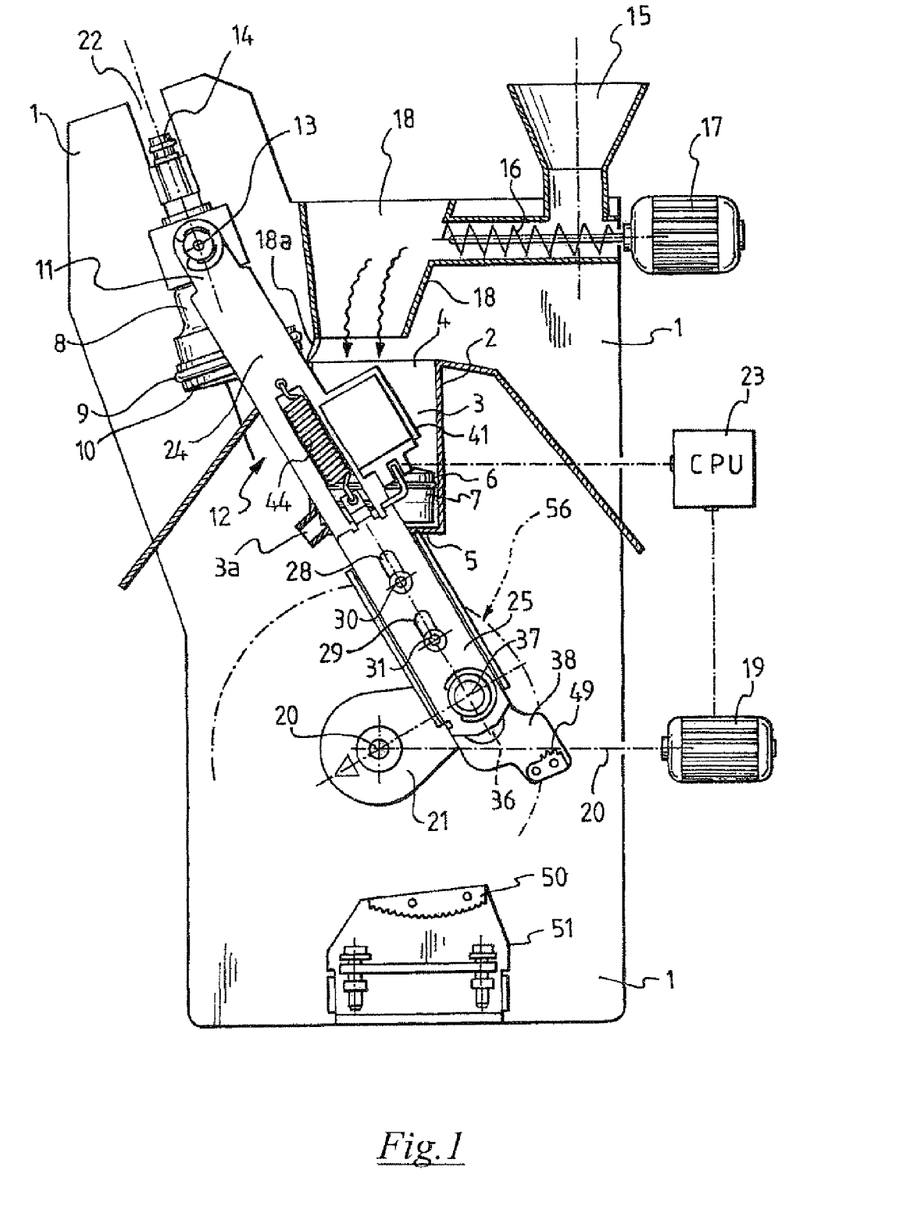
FIG. 1 shows a schematic side view of the apparatus according to an embodiment of the invention with the connecting-rod-and-crank mechanism shown in a position in which the piston for closure of the infusion chamber is located outside said chamber and with the chamber positioned beneath the coffee powder loading hopper of a grinding and dosing device.
Figure 3:
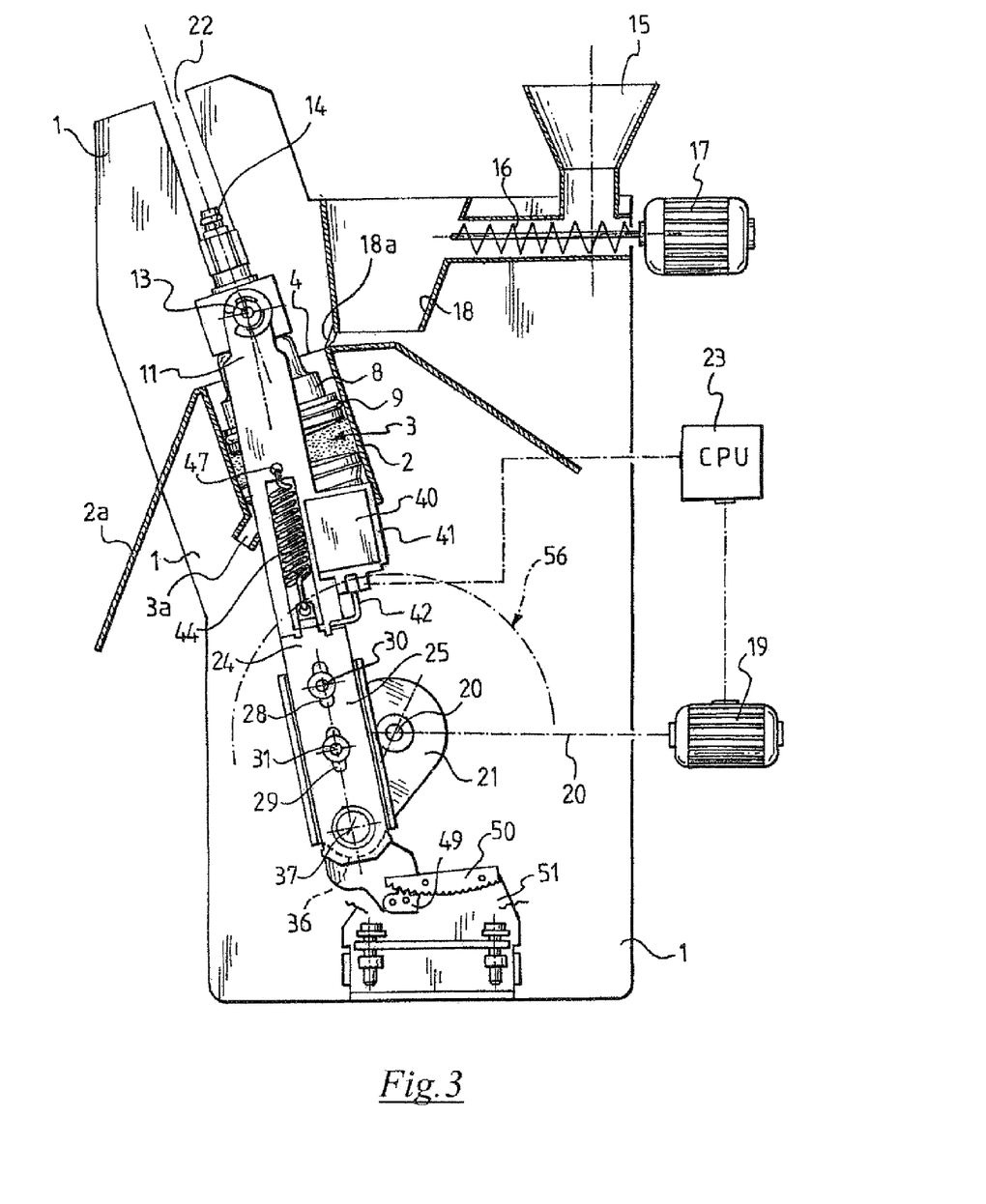
FIG. 3 shows a schematic side view of the apparatus according to the embodiment illustrated in FIG. 1, wherein the connecting-rod-and-crank mechanism is shown in a position in which the piston is located inside the infusion chamber and has completed the compression of a defined dose of ground coffee.

The cylinder 2 which, for the loading of a dose of ground coffee, at the beginning of a cycle of preparation of the beverage, is located in a position underneath the chute 18, as shown in FIGS. 1 and 2, is displaced angularly until it assumes the position aligned with that of the movement of the piston 8, as shown in FIGS. 3 and 4.

For the opening and closing of the infusion chamber 3 and therefore for inserting the piston 8 into, and withdrawing it from, the cylinder 2, a drive device is provided which comprises an electric motor 19, keyed onto the shaft 20 of a crank 21 and the connecting rod 12.

For the same purpose, a conventional guide element is also provided, comprising, for example, a groove 22, provided in the wall 1 of the frame of the apparatus and in the shape of a cam, in which slidingly engages the pin 13 with which the connecting rod 12 is connected to the piston 8.

To effect the angular displacement of the cylinder 2 from the position beneath the chute 18 to the position for operating the piston 8 and vice versa, the bottom wall 5 of the cylinder 2 is connected to a support plate 5b which is keyed onto the shaft 20 and pivotal about the latter. The movement is effected by means of known conventional mechanisms.

According to a preferred embodiment of the invention, the piston 8 is inserted inside the cylinder 2, positioning it at different distances from the filter 6 or, more generally, from the bottom 5, so as to form infusion chambers 3 of different volumes according to the type of beverage it is desired to prepare, e.g. espresso coffee of the Mediterranean type or American-type coffee, and therefore depending on the quantity of powdered product measured out and loaded via the chute 18.

The positioning of the piston 8 is determined by the control unit (CPU) 23 which imparts the necessary motion to the electric motor 19 and consequent arrest. The motor 19, for reasons which will become clear from the continuation of the description, is of the type with reversible direction of rotation.

In some preferred embodiments, the connecting rod 12 has a variable longitudinal length.

Figure 5:
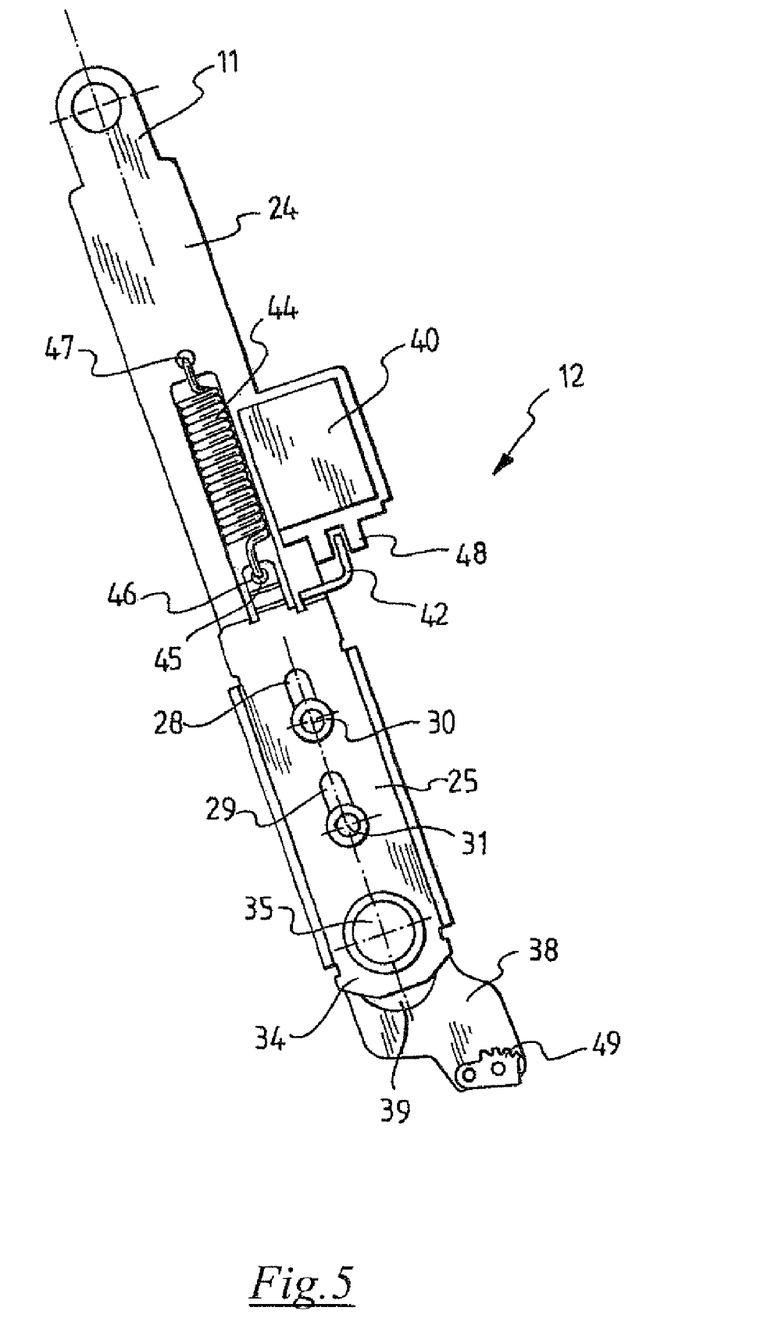
FIG. 5 shows a side view of the connecting rod, according to an embodiment the invention.
Figure 6:
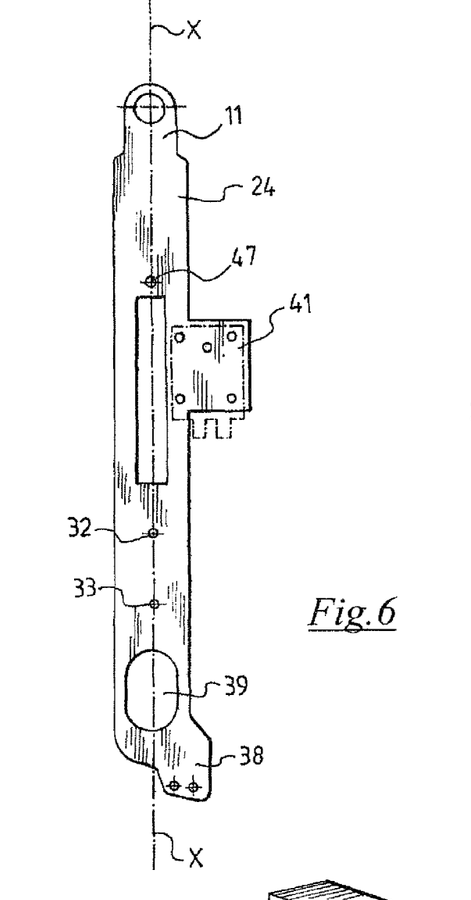
FIG. 6 shows a side view of the first member comprised in the connecting rod of FIG. 5.
Figure 7:
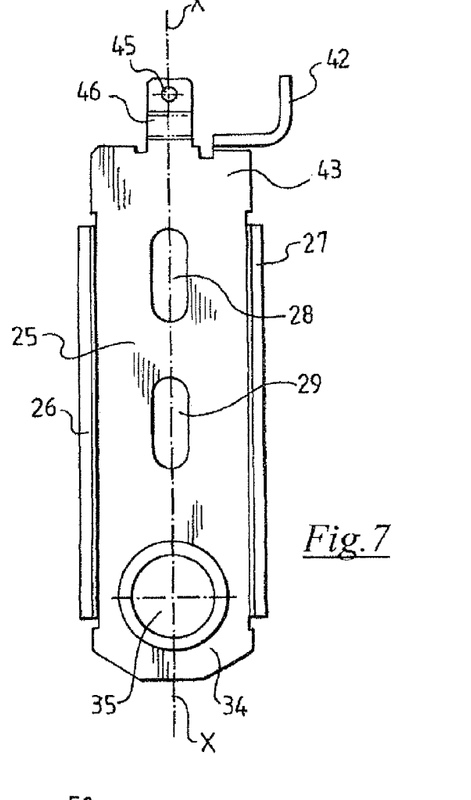
FIG. 7 shows a side view of the second member comprised in the connecting rod of FIG. 5.

With particular reference to FIGS. 5, 6 and 7, the connecting rod 12 comprises a first member 24, extending predominantly longitudinally along an axis X-X, and a second member 25, also extending predominantly longitudinally along the same axis X-X. The member 25 is in fact superposed on the member 24 and the latter can slide within opposed longitudinal guides 26 and 27.

The member 25 is further provided with longitudinal slots 28 and 29 in which engages, with freedom to slide, the shank of respective screws 30, 31 fixed to the underlying first member 24 in corresponding holes 32, 33.

In particular, the axial length of the slots 28 and 29 determines the amount of slide of one member relative to the other, and therefore the elongation and shortening of the connecting rod 12 as a whole.

The member 25 is further provided at its end 34 with a circular hole 35 with which that end is keyed in such a way as to be able to rotate at the end 36 of the crank 21 by means of a pin 37.

The first longitudinal member 24, at its end 38, is provided with a slot 39 by means of which it is connected so as to be able to rotate but also with the possibility of translation in the direction of the axis X-X, on the same pin 37 of the crank 21 on which the end 34 of the second longitudinal member 25 is connected.

The same member 24 is provided with a position sensor 40, mounted on a lateral tongue 41, intended to collaborate with a locating means 42, integral with the second member 25 fixed thereto at its end 43.

The latter is connected by means of a spring 44, for example a coil spring, to the first member 24. The spring 44 is hooked by one of its ends into the hole 45 of a lug 46 of the member 25 and, by the other end, into the hole 47 of the member 24 so as to exert traction between them.

In the preferred exemplary embodiment illustrated, the position sensor 40 comprises an optical device 48 into which is slidingly inserted the locating means 42 integral with the member 25. The spring 44 exerts a tension between the members 24 and 25 such that, in the rest state as illustrated in FIG. 5, the locating means 42 is inserted into the optical device 48 and the screws 30, 31 are in abutment with the end of the slots 28, 29 facing towards the end 36 of the crank 21.

Figure 8:
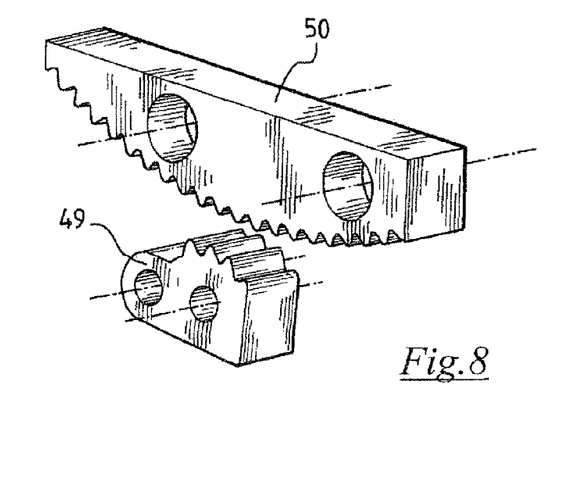
FIG. 8 shows, on an enlarged scale, the locking devices for detachably connecting said first member of the connecting rod to a point outside the apparatus.

The end 38 of the first member 24 is provided with at least one tooth 49, in the embodiment shown in FIG. 8 with a plurality of teeth, apt to engage with an opposed toothed sector 50 borne by the frame of the apparatus by means of a device 51 for adjusting its position in relation to the end 38 of the member 24 and therefore in relation to the tooth 49.

The apparatus described above with reference to the Figures cited, makes possible to carry out the preparation of types of beverages, particular coffee-based beverages, with different volumes.

To this end, after loading the necessary quantity of powdered product into the cylinder 2, the latter is displaced angularly until it assumes a position in axis with the direction of reciprocating movement of the piston 8.

At this point, the piston 8 is commanded to enter the cylinder 2 itself until it meets the powdered product and to continue its insertion by as much travel as is necessary only to effect the compacting of the powdered material.

The compression of the material takes place as a result of the relative movement which occurs between the first member 24 and the second member 25 of the connecting rod 12 in opposition to the force of the spring 44, with the consequent movement of the locating member 42 away from the optical sensor 48.

For a given force of the spring 44, and therefore for a given pressure to be exerted on the coffee powder, the disengagement of the member 42 out of the optical sensor 48 causes a signal to be emitted to the control unit 23 which proceeds to stop the motor 19 which had been moving in a first direction of rotation, for example, in the case illustrated, in an anticlockwise direction.

The infusion chamber 3 is closed by the piston 8 with the formation of a corresponding defined chamber volume suitable for the type of beverage to be prepared.

At this point, with the motor 19 kept inactive, the control unit 23 effects the admission of the pressurised water at the conventional temperature necessary for the beverage being prepared. The pressurised water reaches the inside of the infusion chamber 3 via the connector 14 of the piston 8 and the inner channel 8a which traverses the latter axially.

The admission of the pressurised water initially causes lifting of the piston 8 relative to the bottom 5 of the cylinder 2 with the consequent axial displacement of the first member 24 of the connecting rod 12 which can slide with respect to the second member 25, connected to the pin 37 of the crank, thereby gradually increasing the traction of the spring 44 until the tooth 49 engages with an upstanding zone of the toothed sector 50, as illustrated in FIG. 3.

The engagement between the at least one tooth 49 and the sector 50 effects the axial locking of the member 24 of the connecting rod 12 in the angular position which it has reached. The further action exerted by the pressurised water inside the infusion chamber 3 on the piston 8, although it gives rise to the formation of a torque with respect to the axis of rotation 20 of the motor, does not need to be opposed by a counter torque exerted by the motor 19 in order to remain at a standstill in equilibrium since the torque is discharged onto the structure 1 of the apparatus as a consequence of the coupling between the tooth 49 and the toothed sector 50.

At the end of preparation of the beverage which, in the meantime, has been dispensed via the opening 3a of the infusion chamber 3, the admission of the pressurised water ceases and the chamber 3 is emptied of the residual water.

Since the connecting rod 12 is prevented from continuing its travel by the volume of exhausted powder present in the chamber, the thrust on the piston 8 decreases. The spring 44 therefore causes the first member 24 of the connecting rod 12 to be lowered, with the consequent disengagement of the tooth 49 from the toothed sector 50 and squeezing of the exhausted grounds present in the chamber 3.

Since the movement of both the member 24 and the crank 21 is now freed, the motor 19 is actuated in the opposite direction of rotation, causing the piston 8 to be lifted within the cylinder 2 until it is completely withdrawn via the opening 4.

The reversal of the direction of rotation of the motor 19 is commanded by the control unit 23, which has received consent for this from the signal which has come from the optical sensor 48 which has again been engaged by the member 42.

FIGS. 9 to 15 illustrate an expulsion device for expelling the exhausted powder according to a preferred embodiment of the invention. The plate 7 for expelling the layer 7a of exhausted coffee powder is connected to a stem 52 which is positioned so as to slide parallel to the axis of the cylinder 2 and which emerges from the bottom 5 via an opening 5a with the interposition of suitable conventional sealing devices.

The end 53, outside the cylinder 2, is hinged at the vertex 54a of a substantially triangular plate 54 which, at the other vertex 54b, is provided with a sliding device, preferably a roller 55. In the present embodiment, the triangular plate 54 and the sliding device 55 provide an engaging member.

Provided at the third vertex 54c of the triangular plate 54 is the hinged connection to the mechanisms, not illustrated since they are known and conventional, intended to impart the pivoting movement to the cylinder 2 via the support plate 5b connected to the bottom 5 of the cylinder itself.

Fitting devices, apt to engage with the engaging member, are provided. The roller 55 engages in a cam path borne by a disc 56. The disc 56 is keyed onto the axis 20 of the motor 19 and is therefore rotatable in both directions of rotation together with the motor 19 itself.

The cam path comprises a first curved section, indicated by the arrow F, constituted by a groove formed in the outer circular wall 57 of the disc 56 and by the curved edge 58 of a beak-shaped member 59 mounted on the disc 56.

Figure 9:
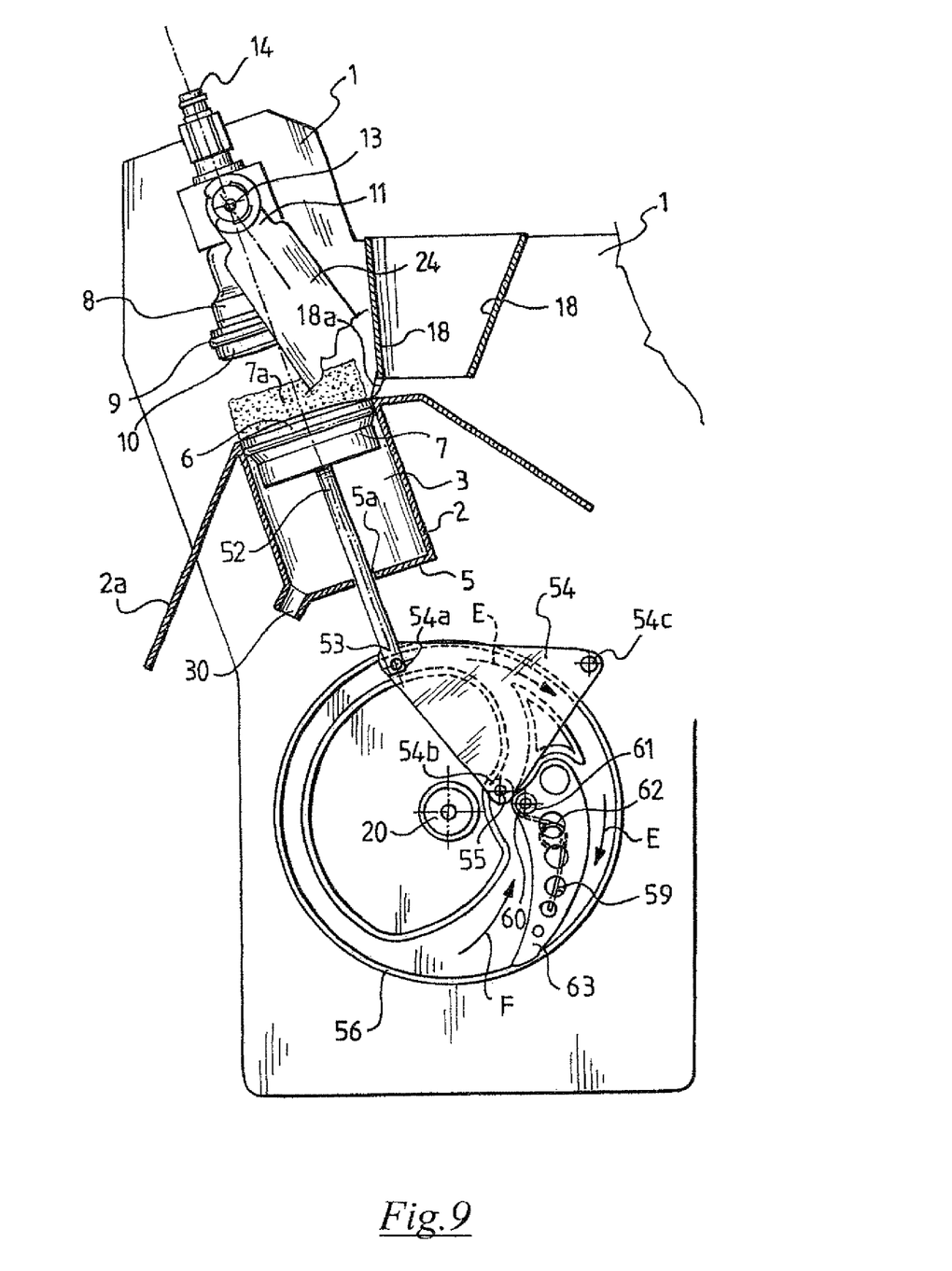
FIG. 9 shows a side view of the apparatus according to an embodiment of the invention, schematically illustrating an expulsion device for expelling from the infusion chamber the layer of exhausted ground product after the preparation and dispensing of the beverage.

The beak-shaped member 59 is mounted to pivot about a pin 60, borne by the disc 56, and which engages in the hole 61. The member 59 is pushed by a spring 62 towards the wall 57 of the disc 56, with resilient pivoting about the pin 60, so as to obstruct, with the point 63, the path indicated by the arrow E, as indicated in FIG. 9, which illustrates the position of the expulsion device assumed at the end of a phase of expulsion of the layer 7a relative to the quantity of exhausted powder after the dispensing of the beverage. In the illustrated embodiment, the fitting devices comprise the member 59 and the spring 62.

During the rotation of the disc 56 in an anticlockwise direction, the roller 55 is initially forced to travel over the section of cam indicated by the arrow E, pressing the edge 58 of the beak-shaped member 59 and, overcoming the resilient force of the spring 62, the gap opens for passing over the end 63 of the member 59.

With the reversal of the direction of rotation of the disc 56, the roller 55, after travelling over the cam section indicated by the arrow F, reaches the position illustrated in FIG. 9, causing the lifting of the stem 52 and therefore of the plate 7 for expelling the layer 7a.

The lifting of the plate 7 at the end of the dispensing of the beverage causes the emergence of the layer 7a of exhausted coffee powder from the cylinder 2, as indicated in FIG. 9. The layer 7a is then pushed towards the outside of the apparatus towards a conventional collection point, not illustrated, when the cylinder 2 is again displaced angularly to place its opening 4 beneath the chute 18 in order to load a fresh dose of powdered coffee.

The thrust towards the outside is brought about by the layer meeting a scraper 18a borne by the chute 18.

The layer 7a descends along a chute 2a integral with the cylinder 2.

Figure 12:
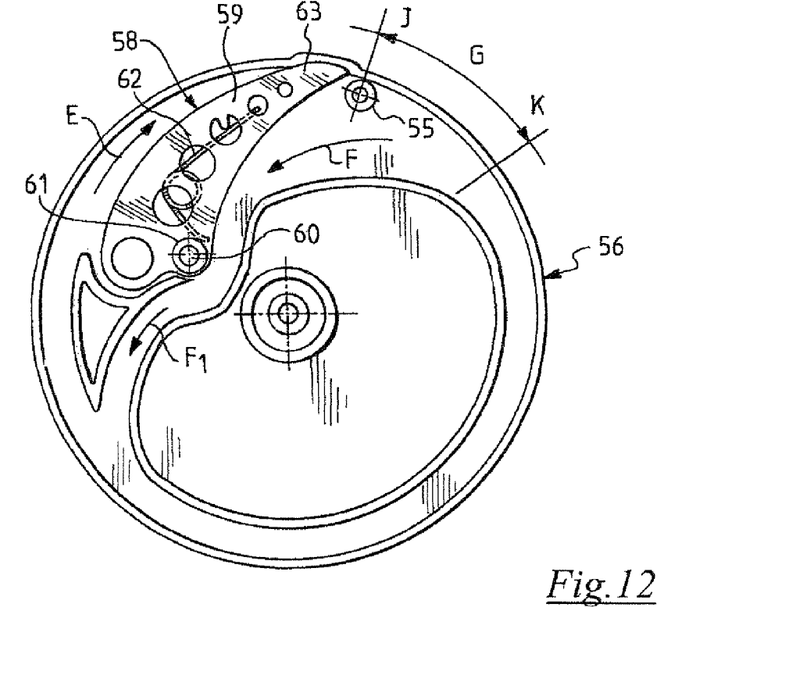
FIG. 12 shows a plan view of the cam of FIG. 11, illustrated in the position reached at the end of the compression of the layer in the case of the maximum dose.
Figure 13:
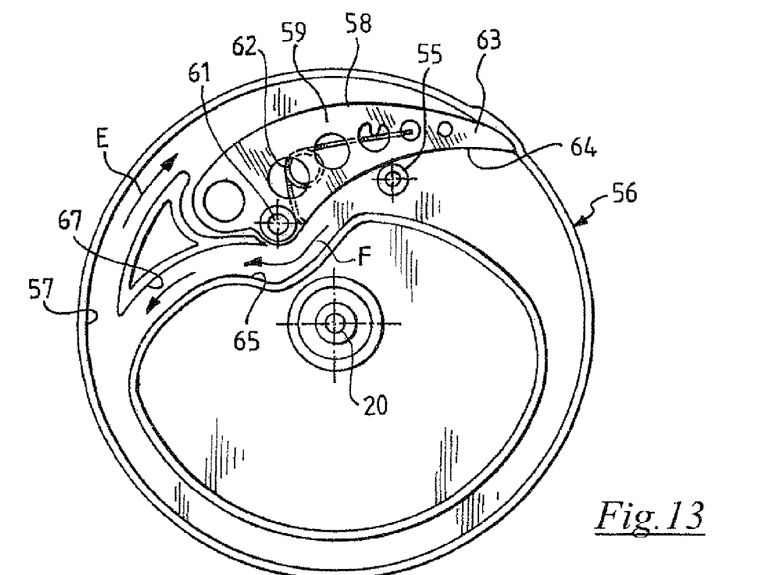
FIG. 13 shows a plan view of the cam of FIG. 11, illustrated in a position assumed during the expulsion of the layer.
Figures 14, 15:
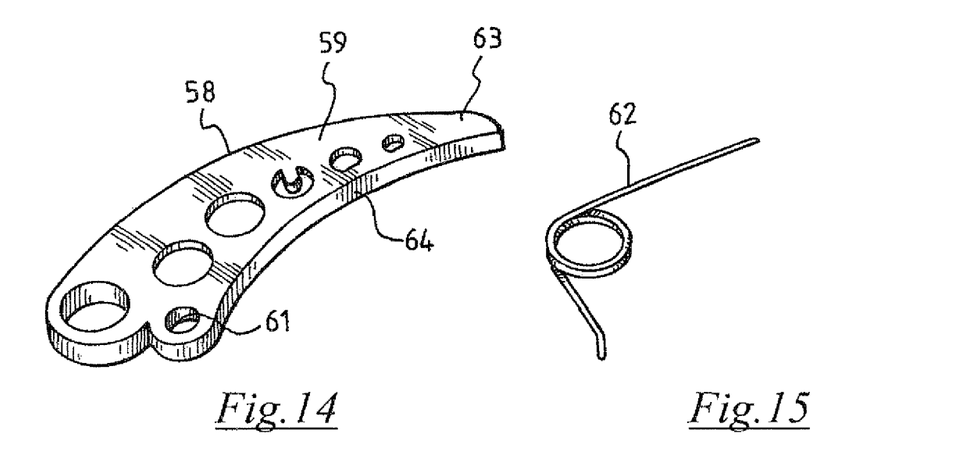
FIG. 14 shows a plan view of a mechanical component of the cam of FIGS. 11, 12 and 13.
FIG. 15 shows in plan view the spring device acting on the mechanical component of FIG. 14.

With reference to FIGS. 9 and 12, the arc G indicates the possible positions in which the roller 55 stops according to the quantity of powder introduced into the chamber 3, i.e. according to the volumetric type of the beverage which has been dispensed.

The position K is that in which the roller 55 stops in the case of a minimum dose of powdered material, while the position J corresponds to the maximum dose.

Once the roller 55 has passed over the end 63 of the member 59, the latter, pushed by the action of the spring 62, closes the passage towards the path of the arrow E. Therefore, when the direction of rotation of the motor 19 and of the disc 56 is reversed, the roller 55 is prevented from entering therein and is deflected along the path indicated by the arrows F and F1.

The path indicated by the arrow F is formed by the edge 64 of the member 59, opposite to the edge 58, together with the opposed shaped wall 65 of the disc 56. In this section F the reaction of the roller 55 against the edge 64 transmits to the member 54 the upward thrust movement of the stem 52 and, at the end of the path F, when the roller 55 arrives at the pin 60, the layer 7a is outside the chamber 3 of the cylinder 2. When the expulsion of the layer 7a from the cylinder 2 is completed, the angular displacement of the cylinder 2 itself takes place in a clockwise direction, determined, in a known manner, by the support plate 5b integral with the bottom 5, while the roller 55 continues its travel in the section of the path indicated by the arrow F1 and, reacting against the wall 66, transmits to the member 54 the movement which causes the lowering of the stem 52 and the positioning of the plate 7 within the cylinder 2 itself as far as the bottom 5 of the latter, restoring the initial conditions for further beverage dispensing.

After reaching the end of the cam path indicated by the arrow F1, the roller 55 is located at the start of the cam path indicated by the arrow E, ready to carry out another cycle.

The device for expelling the exhausted powder according to the invention makes possible to carry out the expulsion in all those cases in which the closure of the cylinder and the formation of the infusion chamber is effected by a drive device which reverses their direction of actuation in the opening of the infusion chamber relative to that of closure.

It is to be understood that the dimensions and also the materials may be any whatever, depending on requirements, without thereby departing from the scope of the invention as described above and claimed hereinafter.

The invention claimed is:

1. Apparatus for the preparation and dispensing of doses, in selectable variable volumes, of infusions, particularly of coffee, by means of pressurised water, comprising an infusion chamber provided with a closed end and an opposed open end, a piston with an end axially insertable into said infusion chamber via said open end and removable therefrom, a water feeding element for feeding a predetermined quantity of pressurised water into said chamber and for opening into the latter in the zone comprised between the end of the piston inserted into the chamber and the closed end of the chamber, a powdered product feeding device for feeding into said infusion chamber a predetermined quantity of powdered product from which to form the infusion in an amount proportional to a volume selected for the dose of infusion to be prepared, displacement elements for displacing said infusion chamber between the position in which a defined quantity of powdered coffee is introduced and the position in which said piston is inserted and withdrawn via said open end and vice versa, at least one opening in said chamber for dispensing the prepared infusion, an expulsion device for expelling from said infusion chamber the quantity of exhausted product used for the infusion at the end of preparation thereof, a drive device for actuating said piston within said infusion chamber and outside it, a guide element for the piston, said drive device comprising an electric motor, a connecting-rod-and-crank mechanism in which a crank is connected to a rotation shaft of the motor and a connecting rod is connected between an end of the crank and the end of the piston which remains outside said infusion chamber, and a control unit for controlling the drive device and the water feeding element, wherein:

said motor is reversible in its direction of rotation, and
said expulsion device comprises a small plate positioned inside said infusion chamber in proximity to the bottom thereof, and movable axially within the chamber, a stem connected to said plate and emerging so as to slide in a sealed manner through an opening of said closed bottom, the free end of said stem being provided with an engaging member for engagement with cam profiles borne by a rotating disc keyed onto the rotation shaft of said motor with reversible direction of rotation, said profiles being selected according to the direction of rotation of the motor, fitting devices for engaging said engaging member in a first cam profile, when the motor rotates in a first direction of rotation, and in at least a second cam profile when the direction of rotation of the motor is reversed, said fitting devices being provided on board said disc.

2. Apparatus according to claim 1, wherein said fitting devices comprise a sector resiliently pivoting about a pin parallel to that of rotation of the disc, carried by said disc in an eccentric position, said sector being provided with a tapered beak-shaped end which interferes resiliently with the path of the first cam profile, opening it as a result of the thrust exerted by said engaging member of said stem when the disc rotates in a first direction of rotation and closing it when the direction of rotation is reversed, exposing the second cam profile to said engaging member of the stem.

3. Apparatus according to claim 1, wherein said engaging member with which said stem is provided comprises a plate, substantially triangular, one vertex of which is connected by a hinge to the free end of said stem while the adjacent vertex is provided with a roller, the latter being in engagement with said cam profiles borne by said rotating disc.

* * * * *